June 2, 1942.　　F. A. FIRESTONE　　2,285,152
MEASURING THICKNESS OF DIELECTRIC MATERIALS
Filed Nov. 18, 1939
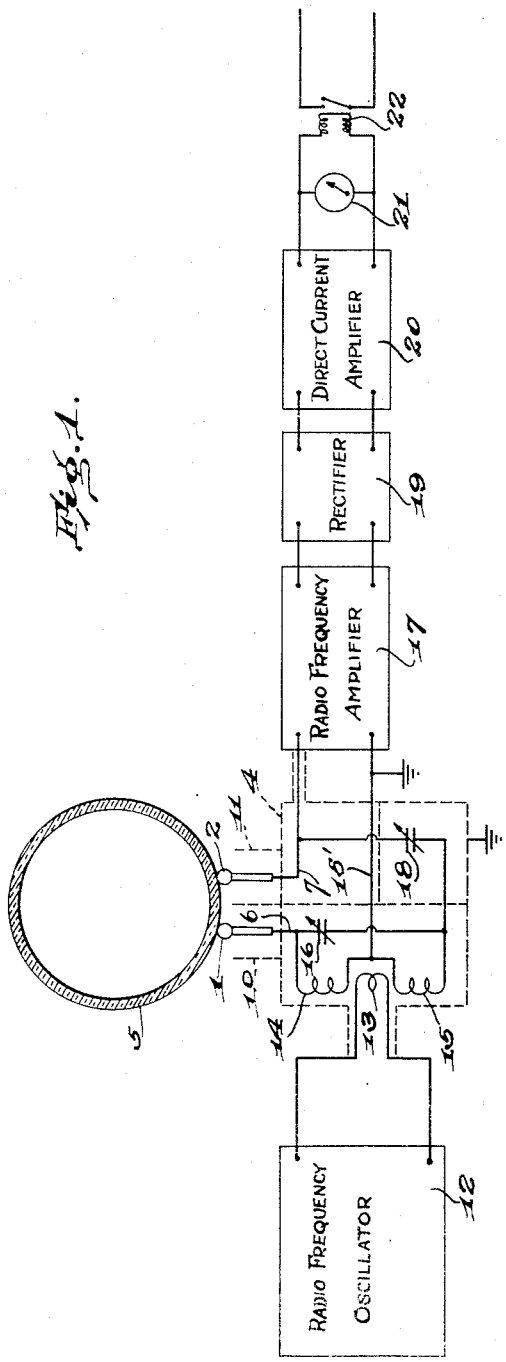
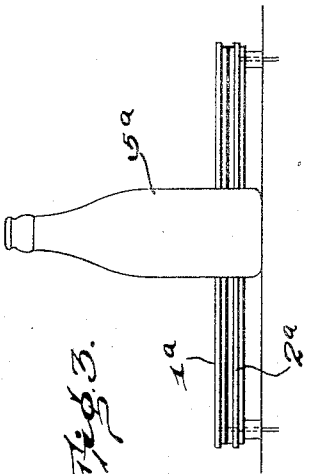
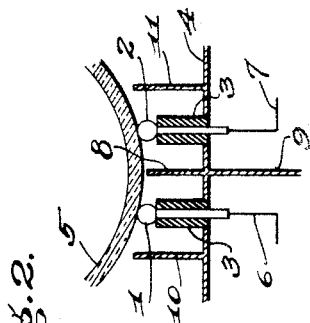
F. A. Firestone
INVENTOR
ATTORNEYS Patented June 2, 1942

2,285,152

UNITED STATES PATENT OFFICE 2,285,152

MEASURING THICKNESS OF DIELECTRIC MATERIALS

Floyd A. Firestone, Ann Arbor, Mich., assignor to Owens-Illinois Glass Company, a corporation of Ohio Application November 18, 1939, Serial No. 305,134

3 Claims. (Cl. 175—183)

My invention pertains to a device for measuring the thickness of a dielectric material electrically, and especially to those cases where one surface of the material is inaccessible or difficult of access. For instance, it is quite difficult to measure the thickness of the glass in bottles by mechanical gauges since the inside surface of the glass is difficult of access so that mechanical gauging is not easily applicable to the routine automatic inspection of bottles for thickness.

An object of my invention is the measurement or indication of the thickness of a dielectric material without the necessity of access to one of the surfaces to which the thickness is being measured.

A further object of my invention is to provide an improved method and means for indicating the thickness of dielectric materials having a face which is inaccessible or not conveniently accessible, which means will function with extreme speed so that routine automatic inspection becomes practicable.

Further objects of my invention will become apparent from the following description taken in conjunction with the drawing in which:

Fig. 1 is a diagrammatic view showing apparatus suitable for use in carrying out my invention;

Fig. 2 is a fragmentary view showing one arrangement of the electrodes; and

Fig. 3 shows a modified form and arrangement of the electrodes.

The broad principle of my invention consists in determining the thickness of a dielectric material by observing the mutual electrostatic capacity between two electrodes placed in contact with one surface of the material, or at a controlled distance from the surface. If a dielectric material is brought into the electrostatic field between two electrodes, their mutual electrostatic capacity is increased and the greater the thickness of the material, the greater will be the increase in capacity. By measuring the capacity, an indication of the thickness of the material is obtained.

Fig. 2 shows an arrangement of electrodes which is suitable. Electrodes 1 and 2 consisting of rounded conducting buttons are supported on insulating bushings 3 which in turn are mounted on a metal plate 4. The piece of material 5, for example, the side of a bottle, whose thickness is to be measured, is placed above and in contact with the electrodes 1 and 2. The electrostatic capacity measured between the wires 6 and 7 is now a measure of the thickness of the material, it being necessary to calibrate with pieces of known thickness, for each kind of material and shape. If the electrodes are placed too close together in comparison with the average thickness of the pieces to be measured, then the capacity will change by only a very small percentage when the thickness of the material is varied. On the other hand, if the electrodes are too far apart, the total capacity between them will be small and also the capacity will depend on the average thickness over a considerable area of the material lying within the field of the electrodes. It has been found that when the electrodes are about six times as far apart as the average thickness of the material to be measured, there is a good compromise between sensitivity and localization of the effective area.

The percentage change in the mutual capacity between electrodes 1 and 2, due to a given change in the thickness of the material being measured, is much increased if the electrodes and the wires 6 and 7 leading to them are shielded from each other by grounded metal plates, including the plate 4 and plates 8, 9, 10 and 11. Also, all of the equipment connected to the wire 6 is shielded from the equipment connected to the wire 7. By this construction, practically all of the lines of electrostatic flux which pass from the one electrode system to the other pass over by way of the space occupied by the material under test.

With this construction the mutual capacity between the electrodes changes by a maximum percentage due to a given change in the thickness of the material. In general, there are three electrostatic capacities involved in this arrangement, capacity from electrode 1 to the shielding system, capacity from electrode 2 to the shielding system, and capacity from electrode 1 to electrode 2. It is this latter capacity, namely, from electrode 1 to electrode 2, which is mainly utilized as a measure of the thickness of the material under test, in the most improved form of my invention.

The capacity between the electrodes is small, of the order of magnitude of one micro-microfarad. There are a number of methods by which such a small capacity can be measured, but the circuit shown in Fig. 1 has advantages. This circuit includes a radio-frequency oscillator 12 whose frequency is preferably controlled by quartz crystal. This oscillator energizes a coil 13 which couples with equal coils 14 and 15 in such a sense that the outer ends of these coils experience equal voltages in opposite phases. In order to increase the voltages across the coils 14 and 15 they are tuned by a variable condenser 16; the mutual connection of coils 14 and 15 is grounded through a conductor 15' as shown. The high side of the coil 14 is connected to the electrode 1, thereby supplying that electrode with a high frequency voltage. The electrode 2 is connected to the high side of a radio frequency amplifier 17 whose other input terminal is grounded as shown. The high side of the coil 15 connects through a small capacity balancing condenser 18 to the high side of the input of the amplifier 17 as shown. The output of the amplifier 17 feeds a rectifier 19 whose output actuates a direct current amplifier 20 which actuates an indicating voltmeter 21 and relay 22.

In operation the balancing condenser 18 is adjusted so as to have approximately the same capacity as exists between the electrodes 1 and 2 when no dielectric material is in their vicinity. This results in no radio-frequency voltage being fed to the input of the amplifier 17 when no material is in place, and the existence of this adjustment can be checked by observing meter 21. Alternatively, if materials having only a small range of thicknesses are to be measured, it is possible to adjust condenser 18 to give zero indication on meter 21 with the thinnest sample in place; the amplification of amplifier 17 can then be increased and the sensitivity of the apparatus is correspondingly augmented. But assuming that the balancing adjustment has been obtained with no sample in the field of the electrodes, the meter 21 reading zero, if now a sample is placed against the electrodes, the mutual capacity between the electrodes will be increased, the balance will be disturbed, an alternating voltage dependent in magnitude on the thickness of the sample will be impressed on the input to the amplifier 17, and the meter 21 will register this voltage, which may easily be interpreted into thickness of the sample through calibration with known samples. The relay 22 may also be set to operate when a critical thickness is passed, so that it becomes possible to operate an automatic sorting mechanism, to grade according to thickness.

The dotted lines in Fig. 1 represent the shielding in that part of the system most closely associated with the electrodes, it being understood that the oscillator and amplifier are likewise shielded. Coils 14 and 15 are in one shielded compartment, condenser 18 in another compartment, and the leads from electrode 2 to the amplifier input in a third compartment. The shielding is also extended up around the electrodes 1 and 2 as shown in Fig. 2. By these precautions it is insured that the connection between the various parts of the system should be through the paths outlined above, and stray capacities are reduced to a minimum.

The detailed construction of the oscillator and amplifier can be varied considerably and these components can be devised at once by anyone skilled in the art. The frequency of the oscillator is not critical but it should remain constant during operation; a frequency of 1,500,000 cycles per second is quite satisfactory.

The form of the electrodes may be varied without departing from the spirit of my invention. For instance, as shown in Fig. 3, the electrodes might consist of horizontal bars 1$^a$ and 2$^a$, one above the other, and a vertical bottle 5$^a$ could be pushed along these bars with a rotating motion so as to permit the measurement of the thickness of the glass in the bottle at a certain distance from the bottom. Other methods of indicating the small changes of capacity between the electrodes are well known; for instance, the capacity between the electrodes might be used to control the frequency of an oscillator whose frequency was accurately indicated by a heterodyne method. The sample need not actually touch the electrodes but can be supported at an accurately determined distance from them, provided it is still in the electrostatic field.

Modifications may be resorted to within the spirit and scope of the appended claims.

I claim:

1. Apparatus for measuring the thickness of a dielectric material which comprises a pair of electrodes spaced apart and arranged to be placed both in juxtaposition to one side of said material with the latter bridging the space therebetween, grounded plates of conducting material surrounding said electrodes, and electrical means for indicating a change in the electrical capacity between the electrodes when said dielectric material is placed in said position.

2. Apparatus for measuring the thickness of a dielectric material which comprises a pair of electrodes spaced apart and arranged to be placed in juxtaposition to one side of said material with the latter bridging the space therebetween, a source of high frequency current oscillations, a pair of coils energized thereby, a balancing condenser, said coils and condenser being connected in circuit with said electrodes, and shielding means comprising grounded plates of conducting material surrounding and shielding said electrodes, coils and balancing condenser.

3. Apparatus for measuring the thickness of a dielectric material which comprises a pair of electrodes spaced apart and arranged to be placed in juxtaposition to one side of said material with the latter bridging the space therebetween, a source of high frequency current oscillations, a pair of coils energized thereby, a balancing condenser, said coils and condenser being connected in circuit with said electrodes, and shielding means comprising grounded plates of conducting material forming separate compartments for said condenser, said pair of coils, and each of said electrodes.

FLOYD A. FIRESTONE.